United States Patent
Jang et al.

[11] Patent Number: 6,081,046
[45] Date of Patent: *Jun. 27, 2000

[54] POWER SUPPLY CIRCUIT FOR MICROCOMPUTER

[75] Inventors: Bong An Jang, Kyungki-do; Masayoshi Sunada, Suwon, both of Rep. of Korea

[73] Assignee: Samsung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/916,206

[22] Filed: Aug. 22, 1997

[30] Foreign Application Priority Data

Aug. 22, 1996 [KR] Rep. of Korea ................ 96-34926

[51] Int. Cl.⁷ .................................................. G06F 1/00
[52] U.S. Cl. .................................... 307/125; 307/130
[58] Field of Search ................... 307/130, 125; 361/189, 190, 191, 192, 193, 79; 323/318, 349, 351, 267, 322; 395/750.01, 180; 364/750, 948.8

[56] References Cited

U.S. PATENT DOCUMENTS

| | | | |
|---|---|---|---|
| 4,279,020 | 7/1981 | Christian et al. | 395/750.05 |
| 4,302,083 | 11/1981 | Kawamura et al. | 396/224 |
| 4,381,459 | 4/1983 | Cotton | 307/139 |
| 4,510,400 | 4/1985 | Kiteley | 307/66 |
| 4,538,074 | 8/1985 | Fraden | 307/126 |
| 4,538,102 | 8/1985 | Takagi et al. | 323/349 |
| 4,544,924 | 10/1985 | French | 340/825.69 |
| 4,585,988 | 4/1986 | Nakai | 323/285 |
| 4,595,972 | 6/1986 | Davis et al. | 363/15 |
| 4,642,479 | 2/1987 | Lombardi et al. | 307/141 |
| 5,126,930 | 6/1992 | Ahn | 363/21 |
| 5,317,470 | 5/1994 | Lendaro | 361/92 |
| 5,561,363 | 10/1996 | Mashino et al. | 322/25 |
| 5,595,489 | 1/1997 | Kwon | 434/319 |
| 5,760,498 | 6/1998 | Park | 307/126 |
| 5,773,965 | 6/1998 | Hayashi | 323/222 |

FOREIGN PATENT DOCUMENTS 360123923 7/1985 Japan.

*Primary Examiner*—Fritz Fleming
*Attorney, Agent, or Firm*—Burns, Doane, Swecker & Mathis, L.L.P.

[57] ABSTRACT

A power supply circuit for supplying a power voltage to a microcomputer is provided. The power supply circuit for a microcomputer includes a power supply portion, a start switch for selecting a start or stop of a control operation of the mcirocomputer, and a power switching portion for opening or closing the power voltage which is supplied to the microcomputer from the power supply portion according to the selection of the start switch. Thus, the power voltage is not supplied to the microcomputer until a user turns on the start switch, to thereby prevent an idling operation of the microcomputer.

17 Claims, 3 Drawing Sheets

POWER SUPPLY CIRCUIT FOR MICROCOMPUTER

BACKGROUND OF THE INVENTION

The present invention relates to a power supply circuit for supplying a power voltage to a microcomputer, and more particularly, to a power supply circuit for a microcomputer in which a power voltage supplied from a main power source to the microcomputer is controlled.

A control apparatus using a processor such as a microcomputer is often adopted in an electric appliance such as a refrigerator, a washing machine and a video cassette recorder (VCR) in order to more accurately control various loads such as a motor. In a control apparatus for an electric appliance, a main power voltage is usually supplied by inserting a power plug into a regular power socket outlet and then various loads are turned on and operate according to key manipulation by a user.

However, a conventional control circuit having a microcomputer in an electric appliance is activated in the state where a power voltage is supplied to a microcomputer and a peripheral circuit as soon as the power plug is inserted into the regular power socket outlet. The microcomputer then awaits a user's key manipulation in such a sate. Thus, during the time when the power plug of the electric appliance is inserted into the socket outlet, the power voltage is supplied to the microcomputer and the peripheral circuit irrespective of operation of the microcomputer. This causes an unnecessary idling operation of the microcomputer. As a result, the life of the microcomputer may be shortened. Also, misoperation or failure may frequently occur when a power voltage level is suddenly changed due to some factor during the time when the microcomputer awaits a user's key operation.

SUMMARY OF THE INVENTION

To solve the above problems, it is an object of the present invention to provide a power supply circuit for a microcomputer in which a power voltage is controlled so that it is not supplied to either the microcomputer and a microcomputer-controlled load driver until a user manipulates a key although a power plug of an electric appliance is inserted into a power socket outlet.

To accomplish the above object of the present invention, there is provided a power supply circuit for supplying a power voltage to a microcomputer and for controlling driving of a load, the power supply circuit comprising: a power supply portion for supplying a power voltage to the microcomputer; a start switch for starting and stopping a control operation of the microcomputer which controls a driving of the load; and a power switching portion for opening and closing the power voltage which is supplied to the microcomputer from the power supply portion according to the selection of the start switch.

The power switching portion can be simply constructed by an active switching device such as a switching transistor whose collector electrode and emitter electrode are connected to the output end of the power supply portion and the lower voltage end of the microcomputer respectively, and which is switched to open or close the collector current according to the selection of the start switch. Preferably, the present invention further comprises another switching transistor which is coupled between the switching transistor and the start switch and is switched to control the operation of the switching transistor according to the selection of the start switch, in order to stabilize a switching operation.

DETAILED DESCRIPTION OF THE INVENTION

A preferred embodiment of the present invention will be described with reference to the accompanying drawings.

Figure 1:
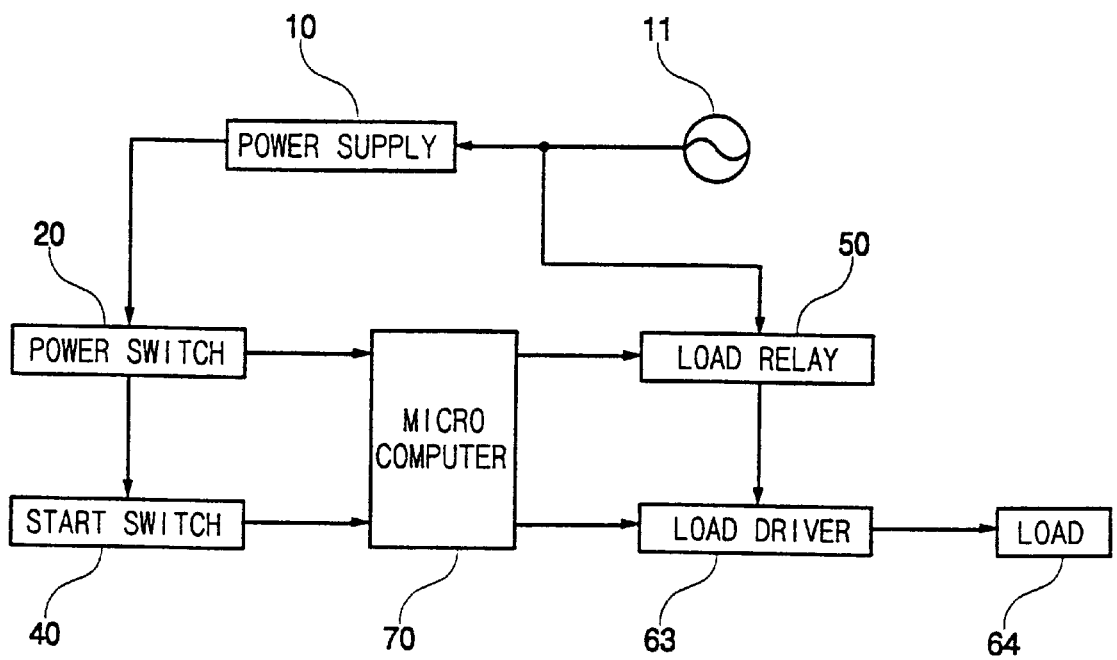
FIG. 1 is a block diagram of a control apparatus for an electric appliance using a power supply circuit for a microcomputer according to the present invention.

In FIG. 1 showing a control apparatus for an electric appliance using a power supply circuit for a microcomputer according to the present invention, a microcomputer 70 performs a predetermined control routine according to a software program in order to control a load driver 63 for driving a load 64. A power supply portion 10 for supplying a power voltage to the microcomputer 70 outputs a necessary direct-current (DC) voltage converted from a commercial power source 11 to the microcomputer 70. A power switch 20 applies or interrupts the output of the power supply portion 10 to the microcomputer 70 according to the selection of a start switch 40. The start switch 40 is selectively manipulated by a user. A load relay 50 applies the alternating-current (AC) voltage from the commercial power source 11 to the load driver 63 and is switched by a signal from the microcomputer 70. The load driver 63 is also operated by a signal from the microcomputer 70, and drives the load 64 by applying the AC voltage supplied via a load relay 50 from the commercial power source 11 to the load 64.

In other words, the power supply portion 10 outputs a necessary power voltage for the microcomputer 70 converted from the commercial power source 11. The output from the power supply portion 10 is interrupted by the power switch 20 and is not input to the microcomputer 70 until a user selects the start switch 40. The power voltage is not supplied to the microcomputer 70 until the start switch 40 is manipulated by the user. Thus, the microcomputer 70 does not operate. If the start switch 40 is manipulated by the user, the power voltage from the power supply 10 is supplied to the microcomputer 70 and, a control operation of the microcomputer 70 is performed. Then, the microcomputer 70 controls the load 64 via the load relay 50 and the load driver 63 according to a predetermined control routine.

Figure 2:
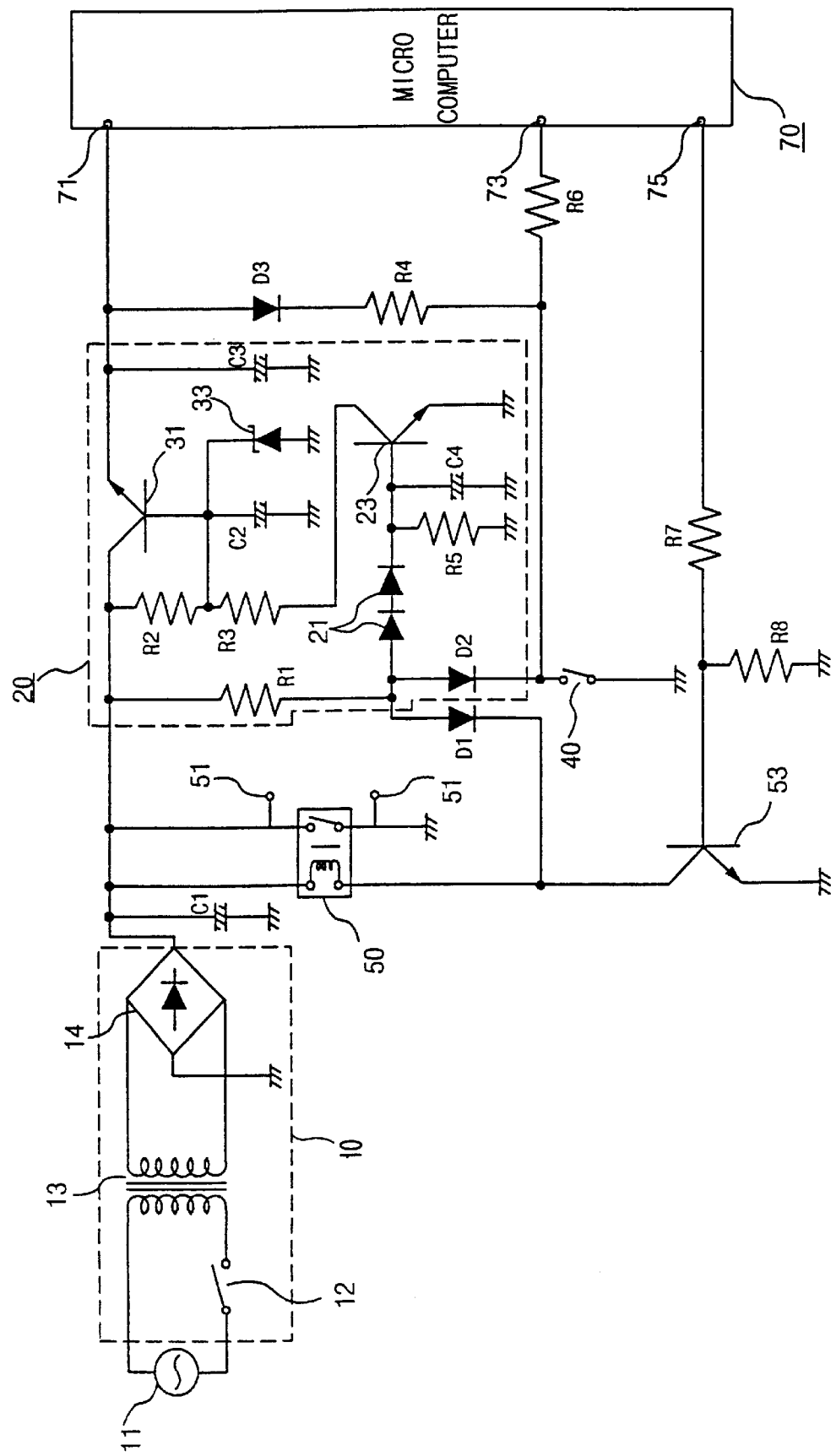
FIG. 2 is a detailed circuit diagram of the power supply circuit for the microcomputer shown in FIG. 1.

FIG. 2 is a detailed circuit diagram showing the power supply circuit for the microcomputer shown in FIG. 1. In this drawing, the power supply portion 10 includes a down-transformer 13 whose primary coil is connected to the commercial power source 11 via a main power switch 12 and a bridge-type rectifier 14. Here, the main power switch 12 indicates the above-described power plug. The power plug is inserted into the commercial socket outlet to turn the main power switch on and the former is disconnected from the latter to turn it off. The down-transformer 13 down-transforms the voltage of the commercial power source 11 into a level necessary for operation of the microcomputer 70, for example, 12V. The rectifier 14 full-rectifies the down-transformed AC voltage and outputs a DC voltage.

The start switch 40 is connected between a connection point of the output end of the rectifier 14 with the start signal input end 73 of the microcomputer 70. and the ground. That is, when the start switch 40 is turned off, the input end 73 of the microcomputer 70 becomes in a logic high state. When the start switch 40 is turned on, the input end 73 of the microcomputer 70 is changed from the logic high state to the logic low sate being the ground potential.

The power switch 20 includes a common base type switching transistor 31, a Zener diode 33, a common emitter type auxiliary switching transistor 23 and diodes 21. The collector electrode of the switching transistor 31 is connected to the output end of the rectifier 14, and the emitter electrode thereof is connected to the power voltage input end 71 of the microcomputer 70. Also, the base electrode thereof is connected to the collector electrode of the auxiliary switching transistor 23 via a resistor R3, and is connected to the ground via the Zener diode 33. Here, the Zener diode 33 regulates the electric potential of the base electrode of the switching transistor 31 to be at a constant level, and maintains the output voltage of the switching transistor 31 at a constant voltage. The collector electrode and the emitter electrode of the auxiliary switching transistor 23 are connected to the base electrode of the switching transistor 31 and the ground, respectively. The base electrode of the auxiliary switching transistor 23 is connected to a connection point between the output end of the rectifier 14 and the start signal input end 73 of the microcomputer 70 via the diodes 21, that is, the non-ground side of the start switch 40. Here, the diodes 21 acts as voltage drops.

In the initial state where the start switch 40 is turned off, the auxiliary switching transistor 23 in the power switch 20 is turned on since a logic high signal is applied to the base electrode thereof. When the auxiliary switching transistor 23 is turned on, the collector electrode thereof is in the conduction state via the emitter electrode to the ground. Accordingly, the voltage between the collector electrode and the base electrode of the switching transistor 31 is by-passed to the ground by the turned-on-auxiliary switching transistor 23. As a result, the switching transistor 31 is turned off since a logic low signal is applied to the base electrode thereof. When the switching transistor 31 is turned off, the collector current is interrupted and the output of the rectifier 14 in the power supply portion 10 is not applied to the power voltage end 71 in the microcomputer 70. Thus, the microcomputer 70 does not operate.

If the start switch 40 is turned on by a user, the base electrode of the auxiliary switching transistor 23 is grounded via the start switch 40. Accordingly, the auxiliary switching transistor 23 is turned off. As a result, since a logic high signal is applied to the base electrode of the switching transistor 31, the switching transistor 31 is turned on. Thus, the collector electrode and the emitter electrode of the switching transistor 31 are in the conduction state, and a power voltage is supplied from the power supply portion 10 to the power voltage end 71 of the microcomputer 70.

At the same time, the start signal input end 73 of the microcomputer 70 is grounded via the start switch 40. As a result, the microcomputer 70 recognizes through a logic low signal at the input end 73 thereof that the load driver can be currently controlled, and then outputs a logic high signal as a load driving signal via a load driving end 75 therein. If the driving signal is output via the load driving end 75, a load switching transistor 53 whose collector electrode is connected to the base electrode of the auxiliary switching transistor 23, whose base electrode receives the driving signal, and whose emitter electrode is grounded, becomes in the conduction state. If the load switching transistor 53 is in the conduction state, the base electrode of the auxiliary switching transistor 23 is grounded. Thus, the turned-off state of the auxiliary switching transistor 23 is maintained and the output of the rectifier 14 is applied to the base electrode of the switching transistor 31 via the load switching transistor 53 and the Zener diode 33 using the ground path as a logic high signal, as in the state where the start switch 40 is turned on. As a result, the turned-on state of the load switching transistor 53 is maintained and the power voltage is stably supplied to the microcomputer 70.

Meanwhile, if the load switching transistor 53 is turned on, a load relay 50 connected between the collector electrode of the load switching transistor 53 and the output end of the rectifier 14 changes to the conduction state and relay contacts 51 and 51' are activated. The contacts 51 and 51' are connected to the commercial power source 11 and the load driver to be described later, respectively. In this manner, when the relay 50 is in the conduction state and the contacts 51 and 51' are activated, the power voltage of the commercial power source 11 is applied to the load driver 63. Accordingly, the load is enabled to be driven.

Figure 3:
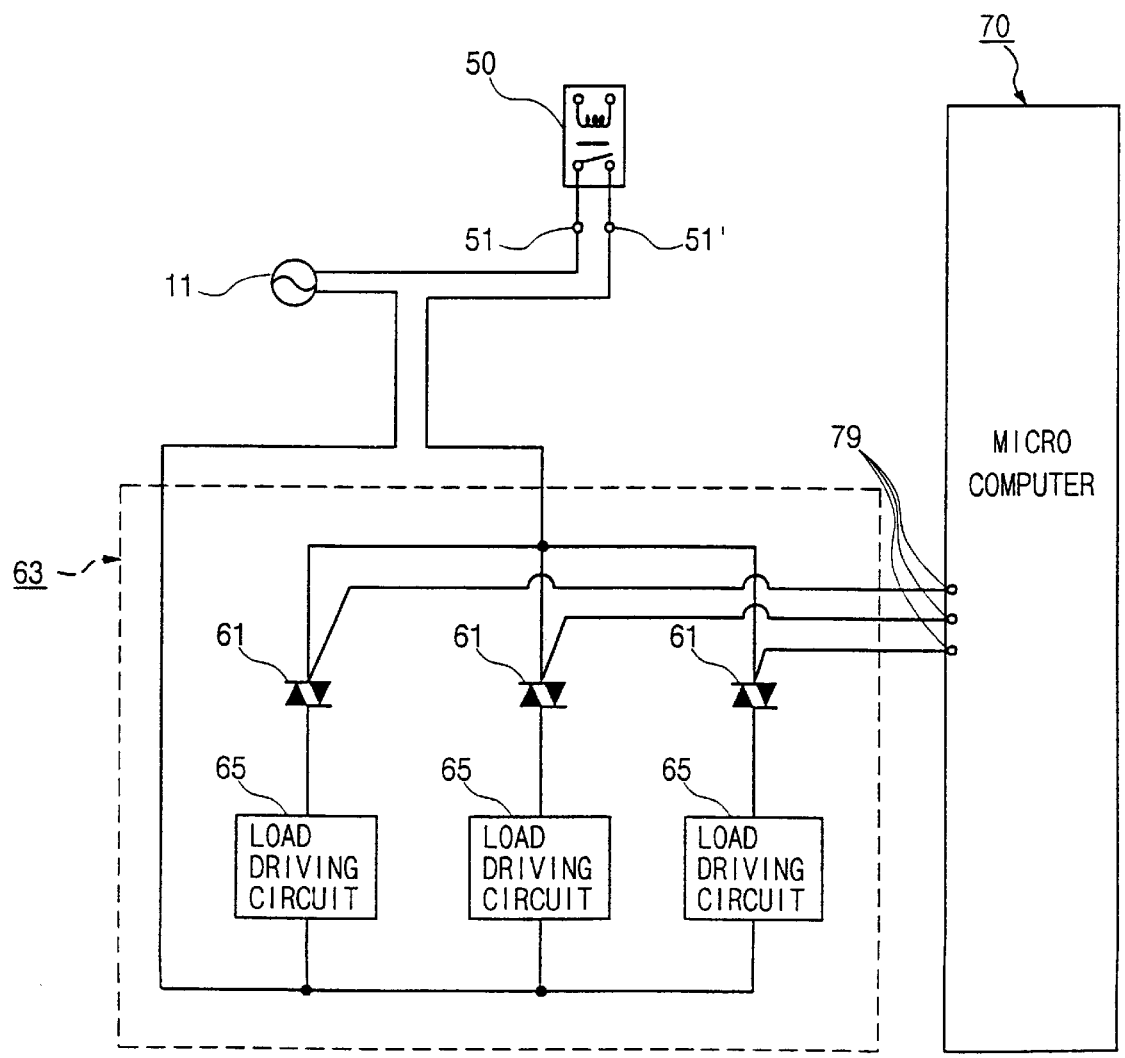
FIG. 3 is a detailed block diagram of a load driver shown in FIG. 1.

FIG. 3 shows the load driver 63 controlled by the microcomputer 70, in more detail. Load driving circuits 65 in the load driver 63 receive the power voltage from the commercial power source 11 via a respective triac (thyristor) 61 to drive a respective load. The triacs 61 are enabled when the contacts 51 and 51' of the relay 50 are activated. If the triacs 61 are enabled, the microcomputer 70 executes a predetermined control routine, to select a driving terminal 79 connected to a load to be driven and output a trigger signal to the gate electrode of a corresponding load-side triac 61 as a driving signal. Accordingly, the triac 61 connected to the selected driving terminal 79 is activated to make the load driving circuit 65 connected to the triac 61 drive the load.

Referring back to FIG. 2, if the start switch 40 is turned off by the user from the turned-on state of the start switch 40, a logic high signal is applied to the start signal input end 73 of the microcomputer 70. The microcomputer 70 judges through the input logic high signal that the controlling of the load is stopped by the user, and immediately interrupts the driving signal from the load driving end 75. Then, a logic low signal is input to the base electrode of the load switching transistor 53, and the load switching transistor 53 is turned off. Thus, the load relay 50 changes to the non-conduction state and the contacts 51 and 51' are turned off. Simultaneously, the auxiliary switching transistor 23 and the switching transistor 31 change to the initial state, and the power voltage of the microcomputer 70 is interrupted. In FIG. 2, reference characters C1 through C4 denote a capacitor, respectively. Reference characters R1 through R8 denote a resistor, respectively. Reference characters D1 through D3 denote a backward-current prevention diode, respectively.

As described above, although the power plug is plugged into the commercial socket outlet, that is, the main power switch 12 is turned on to output the power voltage from the power supply portion 10 to the microcomputer 70 to then apply the power voltage of the commercial power source 11 to the microcomputer 70, the power voltage is interrupted by the power switch 20 unless the start switch 40 is not turned on, in which case the microcomputer 70 does not operate. Thus, the present invention can allow the microcomputer 70 operate only when the start switch 40 is activated by the user.

Thus, the present invention simply solves the conventional problems such as the shortening of the life, misoperation and failure of the microcomputer 70 which may occur due to the fact that the power voltage is applied to the microcomputer 70 and the peripheral devices during the time when the user does not wish to use the electric appliance, and enhances the system reliability.

What is claimed is:

1. A power supply circuit for supplying a power voltage to a microcomputer and for controlling driving of a load, the power supply circuit comprising:

a power supply portion for supplying a power voltage to the microcomputer;

a start switch for starting or stopping a control operation of the microcomputer which controls driving of the load; and a power switching portion for opening and closing the power voltage which is supplied to the microcomputer from the power supply portion according to the selection of the start switch, wherein said power switching portion comprises a switching device for selectively applying the power voltage from said power supply portion to the microcomputer; and an auxiliary switching device for activating the switching device according to an operation of said start switch, and wherein power is precluded from being supplied to the microcomputer until said start switch is activated.

2. The power supply circuit according to claim 1, wherein said switching device comprises a switching transistor whose collector electrode and emitter electrode are connected to an output end of the power supply portion and power voltage end of the microcomputer, respectively, and whose base electrode receives an input signal according to an operation of the start switch, to thereby switch the collector current according to the input signal input to the base electrode.

3. The power supply circuit according to claim 2, further comprising a Zener diode coupled to the base electrode of said switching transistor to limit current input to the base electrode of the switching electrode to a predetermined level so that the output voltage is maintained at a constant level.

4. The power supply circuit for supplying a power voltage to a microcomputer and for controlling driving of a load, the power supply circuit comprising:

a power supply portion for supplying a power voltage to the microcomputer;

a start switch for starting or stopping a control operation of the microcomputer which controls driving of the load; and a power switching portion for opening and closing the power voltage which is supplied to the microcomputer from the power supply portion according to the selection of the start switch, wherein said power switching portion comprises a switching device for selectively applying the power voltage from said power supply portion to the microcomputer; and an auxiliary switching device for activating the switching device according to an operation of said start switch, and wherein said switching device comprises a switching transistor having a collector electrode connected to the output end of the power supply portion, an emitter electrode connected to the power voltage end of the microcomputer, and a base electrode, and wherein said auxiliary switching device comprises an auxiliary switching transistor having a base electrode connected to the output end of the power supply portion and being grounded via said start switch, a collector electrode connected to the base electrode of said switching transistor, and a grounded emitter electrode.

5. The power supply circuit according to claim 4, further comprising a Zener diode coupled to the base electrode of said switching transistor to make the switching transistor be in the conduction state to limit a current input to the base electrode to a predetermined level so that the output voltage is maintained to be a constant voltage.

6. The power supply circuit according to claim 4, further comprising a voltage-drop diode connected to the base electrode of said auxiliary switching transistor.

7. A power supply circuit for supplying a power voltage to a microcomputer and for controlling driving of a load, the power supply circuit comprising:

a power supply circuit outputting a DC power voltage;

a start switch connected to the microprocessor to cause the microcomputer to control driving of the load; and a power switch connected to the power supply circuit, the start switch and the microprocessor to selectively apply the DC power voltage to the microcomputer from the power supply circuit according to the selection of the start switch, wherein said power switch comprises a switching device for selectively applying the power voltage from said power supply circuit to the microcomputer; and an auxiliary switching device for activating the switching device according to the operation of said start switch, and power is precluded from being supplied to the microprocessor until said start switch is activated.

8. The power supply circuit according to claim 7, wherein said power switch comprises a switching transistor whose collector electrode and emitter electrode are connected to the output end of the power supply circuit and a power voltage port of the microcomputer, respectively, and whose base electrode receives an input signal according to the selection of the start switch.

9. The power supply circuit according to claim 8, further comprising a Zener diode coupled to a base electrode of said switching transistor to limit current input to the base electrode of the switching transistor to a predetermined level so that the output voltage is maintained at a constant voltage.

10. A power supply circuit for supplying a power voltage to a microcomputer and for controlling driving of a load, the power supply circuit comprising:

a power supply circuit outputting a DC power voltage;

a start switch connected to the microprocessor to cause the microcomputer to control driving of the load; and a power switch connected to the power supply circuit, the start switch and the microprocessor to selectively apply the DC power voltage to the microcomputer from the power supply portion according to the selection of the start switch, wherein said power switch comprises a switching device for selectively applying the power voltage from said power supply circuit to the microcomputer; and an auxiliary switching device for activating the switching device according to the operation of said start switch, and wherein said switching device comprises a switching transistor having a collector electrode connected to the output end of the power supply circuit, an emitter electrode connected to a power voltage port of the microcomputer, and a base electrode, and wherein said auxiliary switching device comprises an auxiliary switching transistor having a base electrode connected to the output of the power supply circuit and being grounded via said start switch, a collector electrode connected to the base electrode of said switching transistor, and a grounded emitter electrode.

11. The power supply circuit according to claim 10, further comprising a Zener diode coupled to the base electrode of said switching transistor to limit a current input to the base electrode into a predetermined level so that the output voltage is maintained to be a constant voltage.

12. The power supply circuit according to claim 10, further comprising a voltage-drop diode connected to the base electrode of said auxiliary switching transistor.

13. A power supply circuit for supplying a power voltage to a microcomputer and for controlling driving of a load, the power supply circuit comprising:

a power supply portion for supplying a power voltage to the microcomputer and the load;

a start switch for starting or stopping a control operation of the microcomputer which controls driving of the load;

a power switching portion for opening and closing the power voltage which is supplied to the microcomputer from the power supply portion, according to the selection of the start switch; wherein said power switching portion comprises a switching device for selectively applying the power voltage from said power supply portion to the microcomputer; and an auxiliary switching device for activating the switching device according to an operation of said start switch, and a load driving portion for driving the load with a power voltage supplied from the power supply portion; and a relay interposed between the power supply portion and the load driving portion, wherein the relay assumes a conductive state when the power switching portion opens the power voltage of the microcomputer.

14. The power supply circuit according to claim 13, wherein the load driving portion comprises:

a triac being supplied power from the power supply portion, whose operation is controlled by the microcomputer; and a load driving circuit being connected to the triac for driving the load, according to opening and closing of the triac.

15. The power supply circuit according to claim 14, further comprising a plurality of load driving circuits each of which are controlled independently.

16. The power supply circuit according to claim 13, wherein said switching portion comprises a switching transistor whose collector electrode and emitter electrode are connected to an output end of the power supply portion and power voltage end of the microcomputer, respectively, and whose base electrode receives an input signal according to an operation of the start switch, to thereby switch the collector current according to the input signal input to the base electrode.

17. The power supply circuit according to claim 16, further comprising a Zener diode coupled to the base electrode of said switching transistor to limit current input to the base electrode of the switching electrode to a predetermined level so that the output voltage is maintained at a constant voltage.

* * * * *